(12) United States Patent
Richardson et al.

(10) Patent No.: US 10,895,229 B2
(45) Date of Patent: Jan. 19, 2021

(54) CATALYTIC DECOMPOSITION OF STEROL GLYCOSIDES IN A DIESEL FUEL FILTER

(71) Applicant: JAGUAR LAND ROVER LIMITED, Warwickshire (GB)

(72) Inventors: Dave Richardson, Coventry (GB); David Sellick, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 229 days.

(21) Appl. No.: 15/765,286

(22) PCT Filed: Oct. 10, 2016

(86) PCT No.: PCT/EP2016/074167
§ 371 (c)(1),
(2) Date: Apr. 2, 2018

(87) PCT Pub. No.: WO2017/060517
PCT Pub. Date: Apr. 13, 2017

(65) Prior Publication Data
US 2018/0283333 A1    Oct. 4, 2018

(30) Foreign Application Priority Data
Oct. 9, 2015 (GB) .................................. 1517890.8

(51) Int. Cl.
*B01D 35/18* (2006.01)
*B01D 29/11* (2006.01)
(Continued)

(52) U.S. Cl.
CPC ........... *F02M 37/30* (2019.01); *B01D 29/114* (2013.01); *B01D 29/117* (2013.01); *B01D 29/58* (2013.01);
(Continued)

(58) Field of Classification Search
CPC ......... F02M 37/30; F02M 37/22; B01J 29/85; B01J 20/18; B01J 29/7007; B01J 29/084;
(Continued)

(56) References Cited

U.S. PATENT DOCUMENTS

| 5,942,127 A | 8/1999 | Wilcox et al. |
| 2003/0070990 A1* | 4/2003 | Rohrbach ............ B01D 37/025 210/668 |

(Continued)

OTHER PUBLICATIONS

International Search Report and Written Opinion of the International Searching Authority for International application No. PCT/EP2016/074167 dated Dec. 19, 2016.
(Continued)

*Primary Examiner* — Randy Boyer
*Assistant Examiner* — Juan C Valencia
(74) *Attorney, Agent, or Firm* — Carlson, Gaskey & Olds

(57) ABSTRACT

The present disclosure relates to a fuel filter (1) for filtering diesel fuel supplied to an internal combustion engine (2). The fuel filter (1) includes a filter element (12, 19) for trapping and decomposing precipitates suspended in the diesel fuel. An solid acid catalyst like a zeolite is provided for decomposing precipitates trapped by the filter element (12, 19). Sterol glycosides (precipitates) are splitted into sterol and glycoside moieties, which are soluble in the biodiesel, thus preventing clogging of the filter by sterol glycoside agglomerates. The sterol and glycoside moieties pass to the engine where they are burnt. The present disclosure also relates to a method of filtering diesel fuel for supply to an internal combustion engine (2).

8 Claims, 6 Drawing Sheets

(51) Int. Cl.
  *B01D 29/58*   (2006.01)
  *C10G 31/09*   (2006.01)
  *B01J 29/40*   (2006.01)
  *B01J 29/08*   (2006.01)
  *B01J 29/70*   (2006.01)
  *B01J 20/18*   (2006.01)
  *B01J 29/85*   (2006.01)
  *F02M 37/30*   (2019.01)
  *F02M 37/32*   (2019.01)
  *B01D 37/02*   (2006.01)

(52) U.S. Cl.
  CPC .......... *B01D 35/18* (2013.01); *B01D 37/025* (2013.01); *B01J 20/18* (2013.01); *B01J 29/084* (2013.01); *B01J 29/40* (2013.01); *B01J 29/7007* (2013.01); *B01J 29/85* (2013.01); *C10G 31/09* (2013.01); *F02M 37/32* (2019.01); *B01D 2255/50* (2013.01); *B01D 2255/502* (2013.01); *B01D 2255/504* (2013.01)

(58) Field of Classification Search
  CPC ........ B01J 29/40; B01D 37/025; B01D 29/58; B01D 29/117; B01D 29/114; B01D 35/18; B01D 2255/50; B01D 2255/504; B01D 2255/502; B01D 35/005; C10G 31/09
  See application file for complete search history.

(56) References Cited

U.S. PATENT DOCUMENTS

| | | |
|---|---|---|
| 2009/0199460 A1 | 8/2009 | Munson et al. |
| 2010/0236138 A1 | 9/2010 | Bauer et al. |
| 2011/0198280 A1* | 8/2011 | Jones ................ B01D 39/2024 210/489 |
| 2012/0067720 A1 | 3/2012 | Eberle et al. |
| 2013/0012732 A1 | 1/2013 | Seidel et al. |

OTHER PUBLICATIONS

Combined Search and Examination Report under Sections 17 and 18(3) for Application No. GB1517890.8 dated Mar. 31, 2016.
Combined Search and Examination Report under Sections 17 and 18(3) for Application No. GB1617153.0 dated Feb. 17, 2017.

* cited by examiner

CATALYTIC DECOMPOSITION OF STEROL GLYCOSIDES IN A DIESEL FUEL FILTER

TECHNICAL FIELD

The present disclosure relates to fuel filter apparatus and method. More particularly, but not exclusively, the present disclosure relates to a fuel filter apparatus for filtering diesel fuel for supply to an internal combustion engine; and to a related method.

BACKGROUND

A fuel filter is typically associated with an internal combustion engine to mechanically filter contaminants, such as particulates, from the fuel. The fuel filter is provided between a fuel pump and the internal combustion engine to trap particulates and prevent them being introduced into the internal combustion engine.

The present invention has particular application to fuel filters for filtering diesel fuel which may comprise bio-derived components. One group, the sterol glycosides, are a variety of components that have limited solubility in diesel. The solubility temperature of the glycosides is typically above the expected normal operating temperature of the diesel fuel. Sterol glycoside has limited solubility in diesel fuel and can precipitate out of solution forming agglomerates from approximately 10 micron in size. Precipitated sterol glycosides may also act as nucleation sites for the agglomeration of other insoluble compounds such as glycerides. The precipitation of sterol glycoside is particularly prevalent at lower temperatures, for example in cold weather and for cold starts of the internal combustion engine. The effect of this is that insoluble sterol glycoside precipitates are deposited on the fuel filter during cold start phases in cold ambient conditions. The precipitates build up and can lead to the fuel filter 1 becoming partially or completely blocked. When fuel demand is low, for example at part-load conditions, the internal combustion engine will typically continue to run satisfactorily. However, if fuel demand is high, for example at full-load conditions, the fuel supply to the internal combustion engine will be compromised and the engine will not deliver the required power.

Sterol glucoside is a specific example of a sterol glycoside which may be present in bio-diesel. In order to return the sterol glucoside precipitate back into solution would require heating the fuel to 150° C. or higher to exceed its solubility temperature. It will be appreciated that heating the fuel is not practical when the fuel is in the vehicle (energy consumption and safety). Since heating the diesel fuel is not a viable option, the only way to overcome the problem is to change the fuel filter. It is expected that the occurrence of this problem will increase since the amount of bio-diesel used in markets such as Europe and the USA continues to increase.

It is against this backdrop that the present invention has been conceived. At least in certain embodiments, the present invention seeks to overcome or ameliorate at least some of the problems associated with prior art fuel filters.

SUMMARY OF THE INVENTION

Aspects of the present invention relate to a use of a catalyst to decompose sterol glycosides in a fuel filter; to a fuel filter for filtering diesel fuel; to a vehicle comprising one or more fuel filters; and to a method of filtering diesel fuel for supply to an internal combustion engine.

According to a further aspect of the present invention there is provided a use of a catalyst to decompose sterol glycosides in a fuel filter for filtering diesel fuel supplied to an internal combustion engine, the fuel filter comprising a filter element for trapping precipitates suspended in the diesel fuel.

According to a further aspect of the present invention there is provided a fuel filter for filtering diesel fuel supplied to an internal combustion engine, the fuel filter comprising:
 a filter element for trapping precipitates suspended in the diesel fuel; and
 a catalyst for decomposing precipitates trapped by the filter element.

The diesel fuel can comprise bio-diesel components (derived from contemporary biological processes, rather than historic biological processes). Some of the bio-fuel components may precipitate out of solution and the resulting precipitates can agglomerate and cause blockage of the filter element. The fuel filter according to the present aspect of the invention provides a catalytic action that can break down at least some of the molecules present in the bio-diesel. The resulting molecular residue will go back into solution, thereby helping to prevent the fuel filter becoming blocked.

According to a further aspect of the present invention there is provided a method of using a catalyst to decompose sterol glycosides in a fuel filter for filtering diesel fuel supplied to an internal combustion engine, the fuel filter comprising a filter element for trapping precipitates suspended in the diesel fuel, the method comprising passing the diesel fuel through a filter element to trap sterol glycosides suspended in the diesel fuel.

According to a further aspect of the present invention there is provided a method of treating diesel fuel comprising the steps of passing the diesel fuel through a filter element to trap sterol glycosides suspended in the diesel fuel; and use of a catalyst to decompose the sterol glycosides.

The catalyst can be selected to target particular molecules present in the bio-diesel. For example, the catalyst can be suitable for promoting decomposition of precipitates comprising or consisting of sterol glycosides. The catalyst can provide a catalytic surface that will target the C—O—C bond in the sterol glycosides. The molecular residue from the break-down of the sterol glycoside is likely to be a glucose group and a hydrocarbon chain. The glucose will be soluble in water (traces of which are present within diesel fuel) and the hydrocarbon chain will dissolve in the diesel fuel. The catalyst can be suitable for promoting decomposition of precipitates comprising or consisting of sterol glucoside.

At least in certain embodiments, the catalyst can be active below 90° C. The catalyst can be effective at standard fuel pressure within the fuel filter, typically in the range 3 to 3.5 bar. The reaction rate can be relatively slow as there is most likely to be more time when the filter is heated than when it is cold with diesel flowing. The catalyst should be selected such that the catalytic reaction is not strongly exothermic, or is endothermic, to ensure that the reaction will not 'runaway'. The catalyst should be selected so to provide a specific reaction without oxidising or denaturing other molecules. The catalytic action should not affect the majority of the diesel fuel and not degrade the fuels combustion properties, e.g. change cetane number. The catalyst should be relatively in-expensive if the item is to be disposable or recoverable for recycling (provided this is economically viable). At least in certain embodiments, the catalyst should not be sensitive to poisoning by components regularly found in pump diesel fuel, for example sulphur, silicon, additives.

The catalyst can comprise a solid acid catalyst. The catalyst can comprise a zeolite catalyst. The catalyst can comprise one of the following set: silico-alumino-phosphate (SAPO), Zeolite Beta, Zeolite Socony Mobil-5 (ZSM5) and Zeolite Y.

The catalyst can be disposed on the filter element. The catalyst can be incorporated into the filter element. For example, the filter element can be made of a pulp-based material and the catalyst can be incorporated into the pulp. Alternatively, or in addition, the catalyst can be applied to an exterior of the filter element. The catalyst can be deposited on the filter element. The catalyst can be a coating applied to the filter. A pore size of filter element can be increased to make allowance for application of the catalyst as a coating.

The filter element can be an annular filter. Alternatively, the filter element can be planar filter or a conical filter.

The filter element can be a pre-filter. The catalyst can be incorporated into the pre-filter. The pre-filter can have larger pores that another filter element disposed downstream. The filter element can be in the form of an inlet filter element for filtering particulates introduced through a fuel inlet. The catalyst can be applied to an exterior of the pre-filter.

The fuel filter can comprise means for heating the catalyst. The heating means can heat the catalyst to initiate the catalytic reaction, or to promote the catalytic reaction. The catalyst can be heated directly or indirectly. By heating the catalyst, the rate of the chemical reaction can be accelerated to promote decomposition of the precipitates. For example, the heating means can heat the diesel fuel within the fuel filter in order indirectly to heat the catalyst. Alternatively, or in addition, the heating means can be configured to heat the diesel fuel before it enters a filter chamber containing the filter element. If the catalyst is disposed on the filter element, the filter element can be heated.

The heating means can comprise one or more conduit for ducting a heated fluid form the internal combustion engine. Alternatively, or in addition, the heating means can comprise an electrical heating element. The electrical heating element can be configured to heat the diesel fuel and/or the filter.

According to a further aspect of the present invention there is provided a vehicle comprising one or more fuel filter as described herein.

According to a still further aspect of the present invention there is provided a method of filtering diesel fuel for supply to an internal combustion engine, the method comprising:
  passing the diesel fuel through a filter element to trap sterol glycosides suspended in the diesel fuel; and
  using a catalyst to decompose the sterol glycosides trapped by the filter element.

The catalyst can be suitable for promoting decomposition of precipitates, such as the sterol glycosides. More particularly, the catalyst can be suitable for promoting decomposition of precipitates comprising sterol glucoside. The catalyst can comprise a solid acid catalyst. The catalyst can comprise a zeolite catalyst. The catalyst can comprise one of the following set: silico-alumino-phosphate (SAPO), Zeolite Beta, Zeolite Socony Mobil-5 (ZSM5), and Zeolite Y.

The catalyst can be applied to an exterior of the filter element; or the catalyst can be incorporated into the filter element.

The filter element can be a pre-filter. The method can comprise passing the diesel fuel through the pre-filter and then through another filter element.

The method can comprise heating the catalyst to accelerate the rate of the chemical reaction. The catalyst can be heated directly or indirectly. For example, the diesel fuel and/or the filter element can be heated. The method can comprise heating the catalyst in dependence on a measured fuel temperature and/or a measured ambient temperature.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
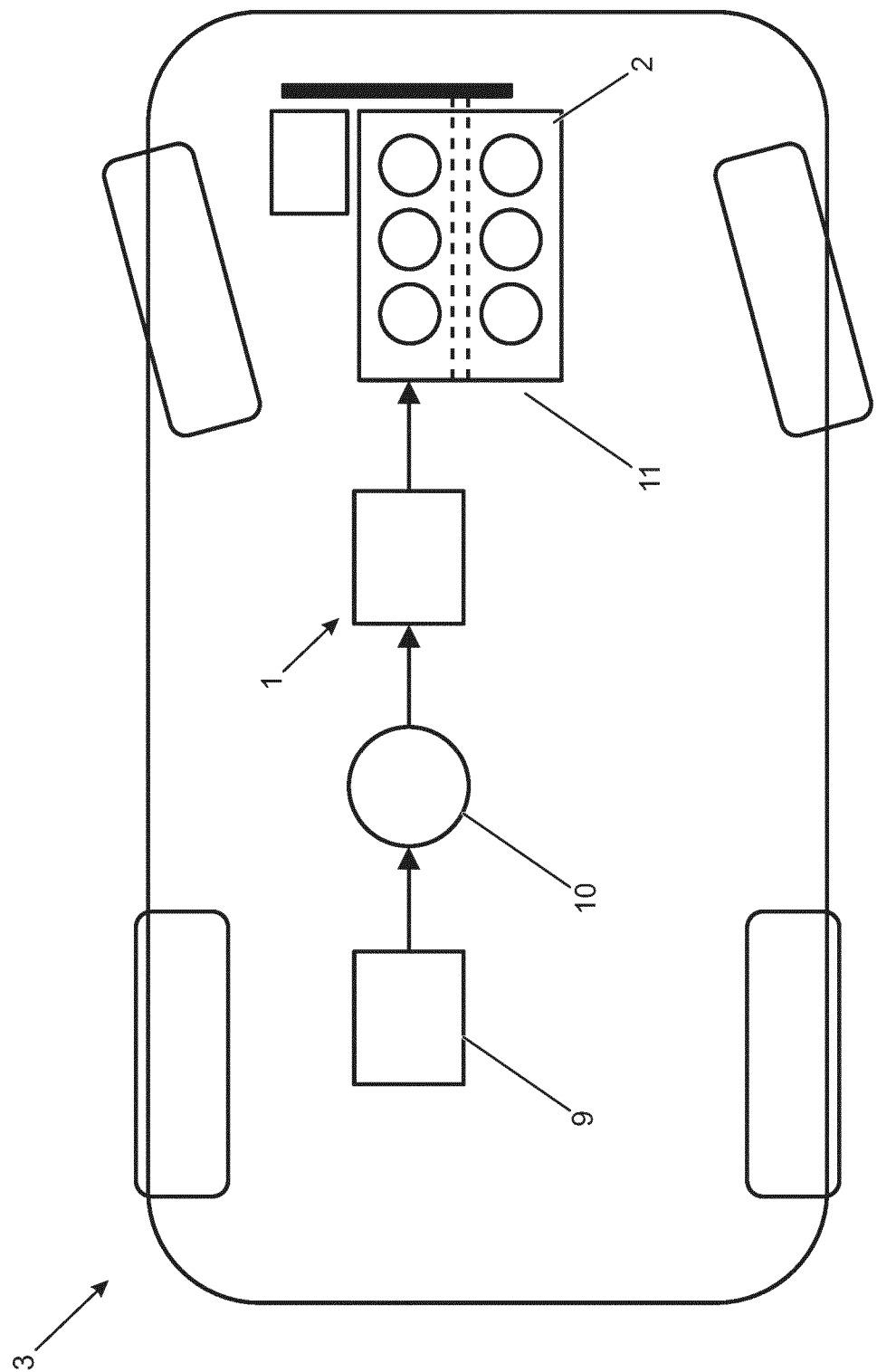
FIG. 1 shows a vehicle incorporating a fuel filter in accordance with an embodiment of the present invention.

A diesel fuel filter 1 in accordance with an embodiment of the present invention will now be described with reference to FIGS. 1 and 2. The fuel filter 1 in the present embodiment is configured to filter diesel fuel for supply to an internal combustion engine 2 in a vehicle 3. As illustrated in FIG. 1, the vehicle 3 in the present embodiment is an automobile, but the fuel filter 1 can be utilised in other vehicle types.

Figure 2:
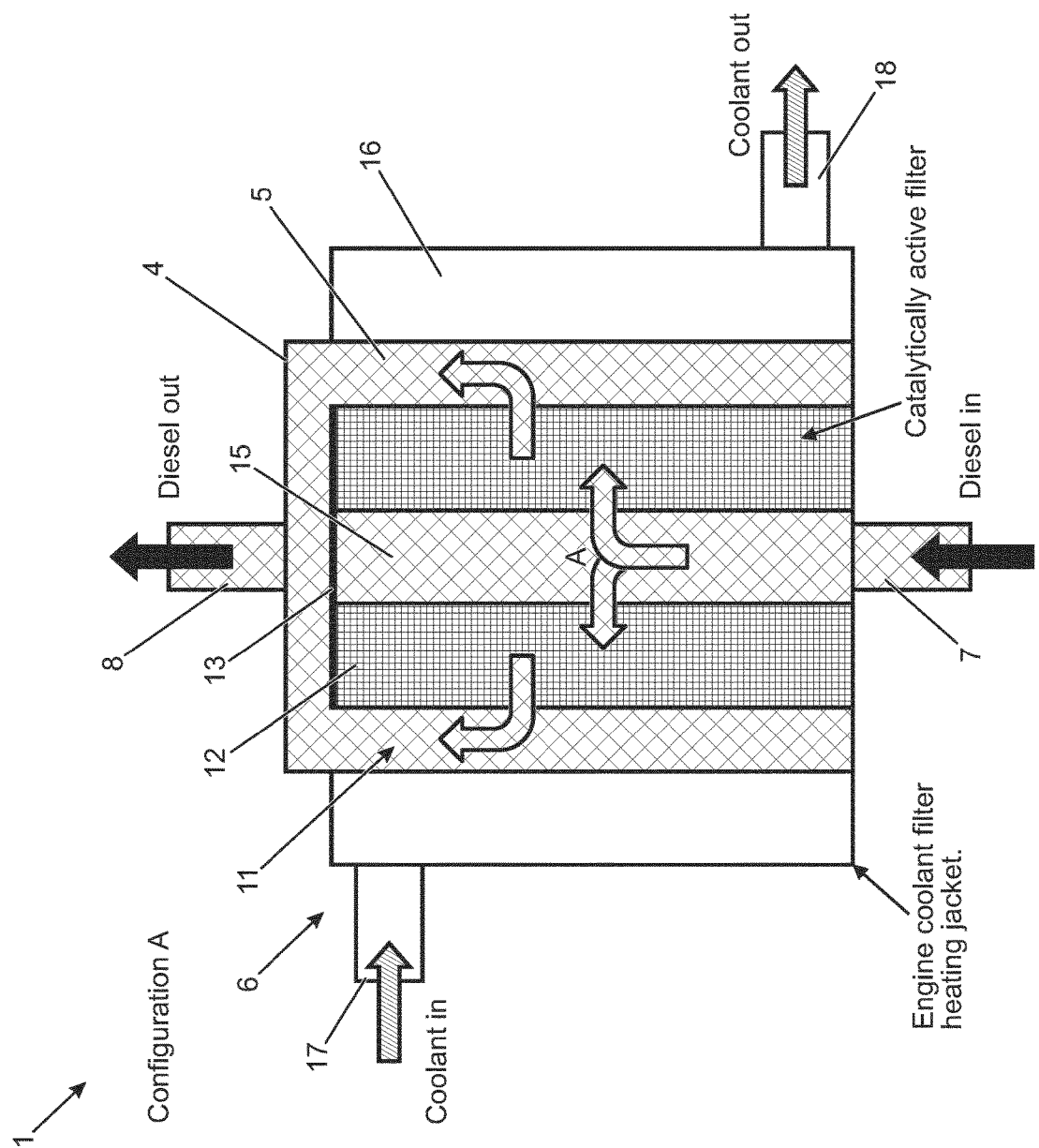
FIG. 2 shows a fuel filter incorporating a catalytic component in accordance with an embodiment of the present invention.

With reference to FIG. 2, the fuel filter 1 comprises a housing 4 forming a filter chamber 5 and a heat exchanger 6. The filter chamber 5 and the heat exchanger 6 are arranged concentrically. The filter chamber 5 is a cylindrical chamber having a fuel inlet 7 and a fuel outlet 8. The diesel fuel is pumped to the fuel filter 1 from a fuel tank 9 by a fuel pump 10. A mechanical filter apparatus 11 is disposed in the filter chamber 5 for mechanically filtering the diesel fuel. In use, the mechanical filter apparatus 11 traps particulates and precipitates suspended in the diesel fuel in order to prevent them being introduced into the internal combustion engine 2. The mechanical filter apparatus 11 comprises an annular filter element 12 and an end plate 13. The annular filter element 12 comprises a porous sheet material, typically a pulp-based material, having a pleated configuration. The pleated sheet material is in the form of an annulus having a central chamber 15. The fuel inlet 7 opens into the central chamber 15 such that, in use, fuel introduced into the filter chamber 5 passes through the mechanical filter apparatus 11 before exiting through the fuel outlet 8.

The heat exchanger 6 comprises a coolant chamber 16 having a coolant inlet 17 and a coolant outlet 18. The coolant chamber 16 is annular and the coolant inlet 17 and the coolant outlet 18 are diametrically opposed from each other. In use, coolant from the internal combustion engine 2 enters the coolant chamber 16 through the coolant inlet 17 and exits through the coolant outlet 18. The coolant is heated by the internal combustion engine 2 and the thermal energy is used to heat the mechanical filter apparatus 11.

As outlined above, the fuel filter 1 is configured to filter diesel fuel. The diesel fuel can be a bio-diesel comprising bio-derived components. The fuel filter 1 can be blocked by precipitates coming out of solution in the bio-diesel. The precipitates are trapped by the mechanical filter apparatus 11 and accumulate on the annular filter element 12 over time. The precipitates can comprise or consist of sterol glycosides, such as sterol glucoside, which can prove particularly problematic. In the present embodiment the annular filter element 12 is catalytically active. In particular, the annular filter element 12 comprises a catalytic component that will decompose glycosides. The catalytic component can be embedded within the annular filter element 12, for example by blending the catalytic component with the pulp-based material used to form the annular filter element 12. Alternatively, the catalytic component can be applied as a coating to the annular filter element 12.

The catalytic component in the present embodiment comprises a zeolite catalyst, such as silico-alumino-phosphate (SAPO), Zeolite Beta, Zeolite Socony Mobil-5 (ZSM5), Zeolite Y. The catalytic component actively decomposes insoluble precipitates comprising sterol glycosides, such as sterol glucoside, which are trapped in the annular filter element 12. In particular, the catalytic component decomposes the sterol glycosides in the trapped precipitates into sugars and hydrocarbons by rupturing the glycosidic link through acid hydrolysis. The C—O—C bond between the glucose group and the hydrocarbon chain within the sterol glucoside precipitate is cleaved. The resulting glucose and hydrocarbon chain are soluble and return to solution in the diesel fuel. Furthermore, these components are combustible within the internal combustion engine 2 during the combustion cycle.

In order to promote the catalytic action to decompose the precipitates, the diesel fuel in the filter chamber 5 and the mechanical filter apparatus 11 are heated by the heat exchanger 6. The coolant is supplied to the coolant chamber 16 from the internal combustion engine 2. The coolant temperature is typically 80-90° C. when the internal combustion engine 2 is at normal operating temperatures. The transfer of thermal energy to the mechanical filter apparatus 11 promotes the catalytic reaction to expedite the breakdown of the sterol glycoside precipitates.

In use, the diesel fuel is pumped into the fuel filter 1 by the fuel pump 10 at an operating pressure of between 3 and 3.5 bar. The diesel fuel enters the central chamber 15 and then flows radially outwardly through the annular filter element 12. The flow through the fuel filter 1 is illustrated by a series of arrows A in FIG. 2. The annular filter element 12 traps particulates suspended in the diesel fuel to prevent them being introduced into the internal combustion engine 2. Any precipitates suspended in the diesel fuel are also trapped by the annular filter element 12 and this may result in clogging of the fuel filter 1. The precipitates can comprise or consist of sterol glycosides, such as sterol glucoside. The catalyst is effective to break down the sterol glycosides thereby decomposing at least some of the precipitates trapped in the filter element 12. The decomposed precipitates are returned to solution, thereby preventing or delaying clogging of the fuel filter 1. By providing a heat exchanger 6, the diesel fuel in the filter chamber 5 can be heated to expedite the catalytic reaction. At least in certain embodiments, the catalyst can actively break down the insoluble precipitates while the engine is hot.

The mechanical filter apparatus 11 is operative to trap particulates suspended in the diesel fuel and actively to break down any precipitates trapped in the annular filter element 12. It will be appreciated that other types of particulate material trapped in the annular filter element 12 are unaffected by the catalytic component. By providing a catalyst in the mechanical filter apparatus 11, blocking of the annular filter element 12 due to the insoluble precipitates in the diesel fuel is reduced or avoided. This helps to allow the internal combustion engine 2 to operate correctly.

Figure 3:
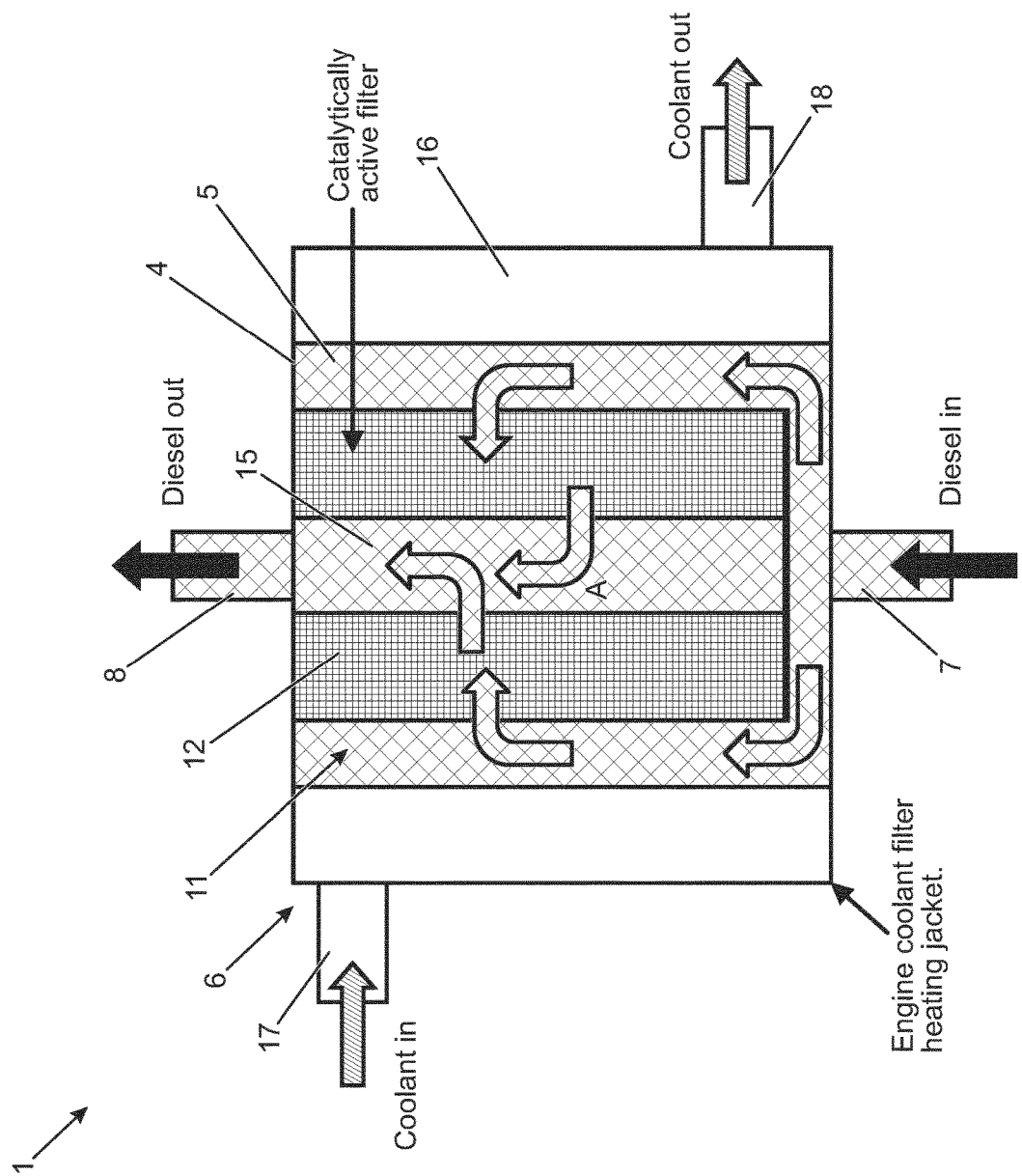
FIG. 3 shows a variant of the fuel filter shown in FIG. 2 incorporating a catalytic component in accordance with an embodiment of the present invention.

A variant of the fuel filter shown in FIG. 2 is shown in FIG. 3. Like reference are used for like components. The primary distinction over the fuel filter 1 shown in FIG. 2 is that the central chamber 15 is open to the fuel outlet 8. The end plate 13 is disposed proximal the fuel inlet 7 such that, in use, fuel is pumped into the fuel filter 1 and directed into an outer region surrounding the annular filter element 12. The diesel fuel then flows radially inwardly through the annular filter element 12 into the central chamber 15. The filtered fuel flows from the central chamber 15 through the fuel outlet 8. The flow through the fuel filter 1 is illustrated by a series of arrows A in FIG. 3. In use, the mechanical filter apparatus 11 traps particulates suspended in the diesel fuel, including particulates which have precipitated out of solution. The precipitates can comprise or consist of sterol glycosides, such as sterol glucoside. The catalyst is effective to break down the sterol glycosides, thereby decomposing at least some of the trapped precipitates and returning them to solution. The catalyst can thereby prevent or delay clogging of the fuel filter 1. It will be appreciated that other types of particulate material trapped in the annular filter element 12 are unaffected by the catalytic component. By providing a catalyst in the mechanical filter apparatus 11, blocking of the annular filter element 12 due to the insoluble precipitates in the diesel fuel can be reduced or avoided.

Figure 4:
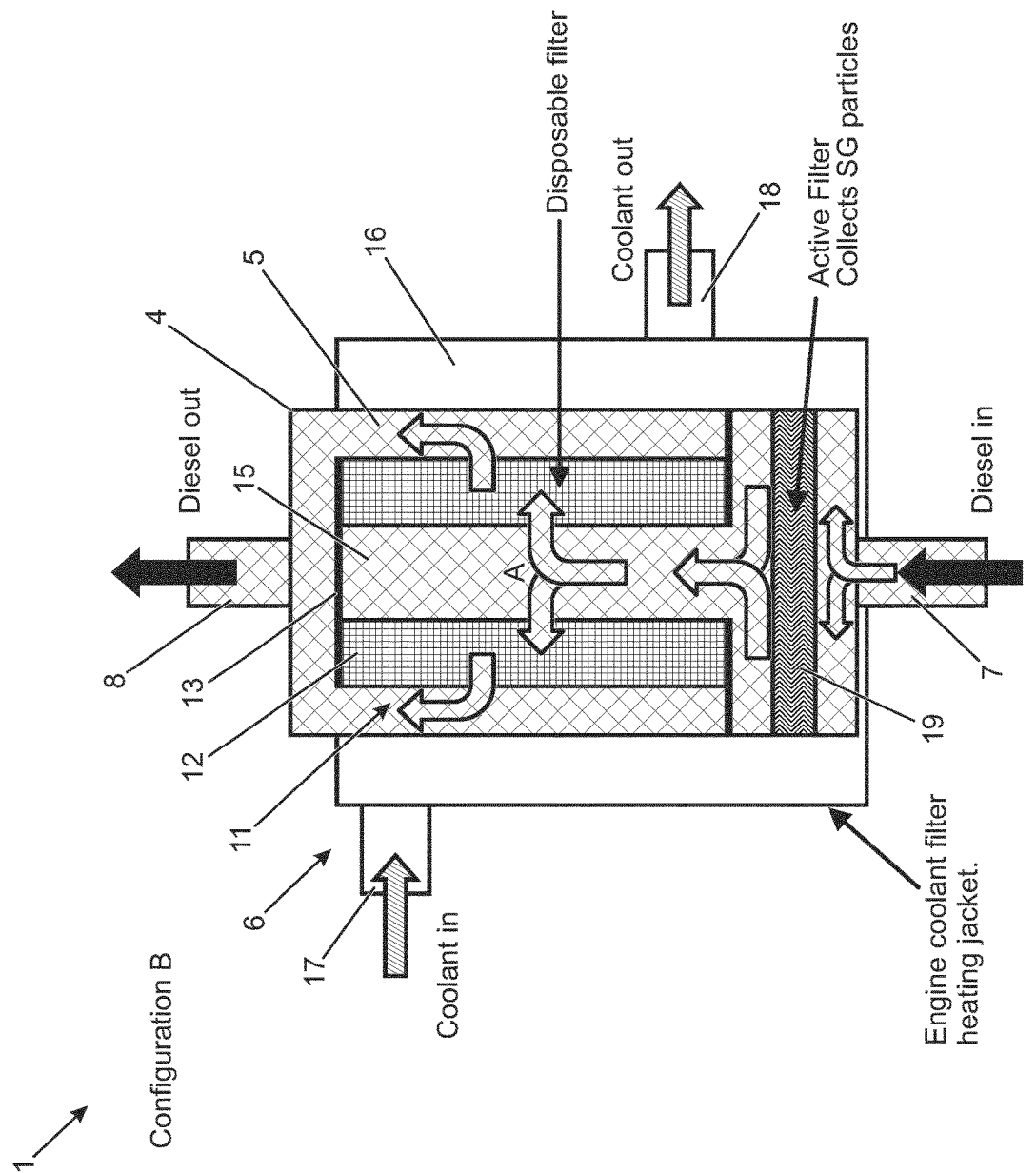
FIG. 4 shows a fuel filter incorporating a catalytic component in accordance with a further embodiment of the present invention.

A further embodiment of the fuel filter 1 in accordance with an aspect of the present invention is shown in FIG. 4. The fuel filter 1 is a development of the previous embodiment and the description herein focuses on the difference for the sake of brevity. Like reference numerals are used for like components.

The fuel filter 1 comprises a housing 4 forming a filter chamber 5 and a heat exchanger 6. The filter chamber 5 and the heat exchanger 6 are arranged concentrically. The filter chamber 5 is a cylindrical chamber having a fuel inlet 7 and a fuel outlet 8. A mechanical filter apparatus 11 is disposed in the filter chamber 5 for mechanically filtering the diesel fuel. The mechanical filter apparatus 11 comprises an annular filter element 12 and an inlet filter element 19 arranged in series. The inlet filter element 19 is disposed upstream of the annular filter element 12 and functions as a pre-filter. The composition of the annular filter element 12 is similar to the arrangement described above in respect of the previous embodiment. In particular, the annular filter element 12 comprises a porous sheet material having a pleated configuration arranged in an annular configuration. However, in the present embodiment, the annular filter element 12 does not include a catalytic component. Instead, the catalytic component is incorporated into the inlet filter element 19.

The inlet filter element 19 is operative to trap precipitates so that they are removed from suspension in the diesel fuel before is passes through the annular filter element 12. The precipitates can comprise or consist of sterol glycosides, such as sterol glucoside. The inlet filter element 19 is catalytically active and comprises a catalyst. The inlet filter element 19 comprises a porous material which supports the catalyst. The catalyst provided in the inlet filter element 19 performs the same function as in the previous embodiment. It will be appreciated, therefore, that the same catalysts can be used in the inlet filter element 19 as described with reference to the annular filter element 12 in the previous embodiment. The inlet filter element 19 could have the same construction as the annular filter element 12 according to the previous embodiment. Alternatively, the inlet filter element 19 can be in the form of a ceramic base, such as aluminium oxide, which acts as a carrier for the catalyst. The pores in the inlet filter element 19 are larger than those in the annular filter element 12 to help prevent the inlet filter element 19 becoming blocked. By providing larger pores in the inlet filter element 19, fuel flow can be maintained even if precipitates are deposited. Moreover, providing larger pores in the inlet filter element 19 may be appropriate to allow for deposition of the catalyst during fabrication in order to ensure that the fuel flow through the inlet filter element 19 is sufficient.

As in the previous embodiment, the coolant chamber 16 is annular and extends around the exterior of the filter chamber 5. The heat exchanger 6 is provided to heat the diesel fuel in the filter chamber 5 and the inlet filter element 19. When the internal combustion engine 2 is at normal operating temperatures, the coolant is typically at a temperature of approximately 80° C. to 90° C. By raising the temperature of the diesel fuel and the inlet filter element 19, the catalytic reaction is promoted so as to break down any sterol glycoside precipitates trapped in the inlet filter element 19.

The operation of the fuel filter 1 is similar to the previous embodiment. The diesel fuel introduced into the fuel filter 1 passes through the inlet filter element 19 and flows into the central chamber 15. The diesel fuel then flows radially outwardly through the annular filter element 12. The flow path of the diesel fuel is illustrated by arrows A in FIG. 4. The inlet filter element 19 performs an initial mechanical filtration and traps at least some of the precipitates suspended in the diesel fuel. The precipitates can comprise or consist of sterol glycosides, such as sterol glucoside. The catalytic component applied to the inlet filter element 19 then actively breaks down the sterol glycosides in the trapped precipitates into a sugar and a hydrocarbon chain. These components are soluble in the diesel fuel and can be combusted by the internal combustion engine 2 during the combustion cycle.

It will be appreciated that the annular filter element 12 in this embodiment could be modified also to incorporate a catalytic component. Thus, the annular filter element 12 and the inlet filter element 19 could each comprise catalysts. The annular filter element 12 and the inlet filter element 19 could comprise the same catalyst or different catalysts.

Figure 5:
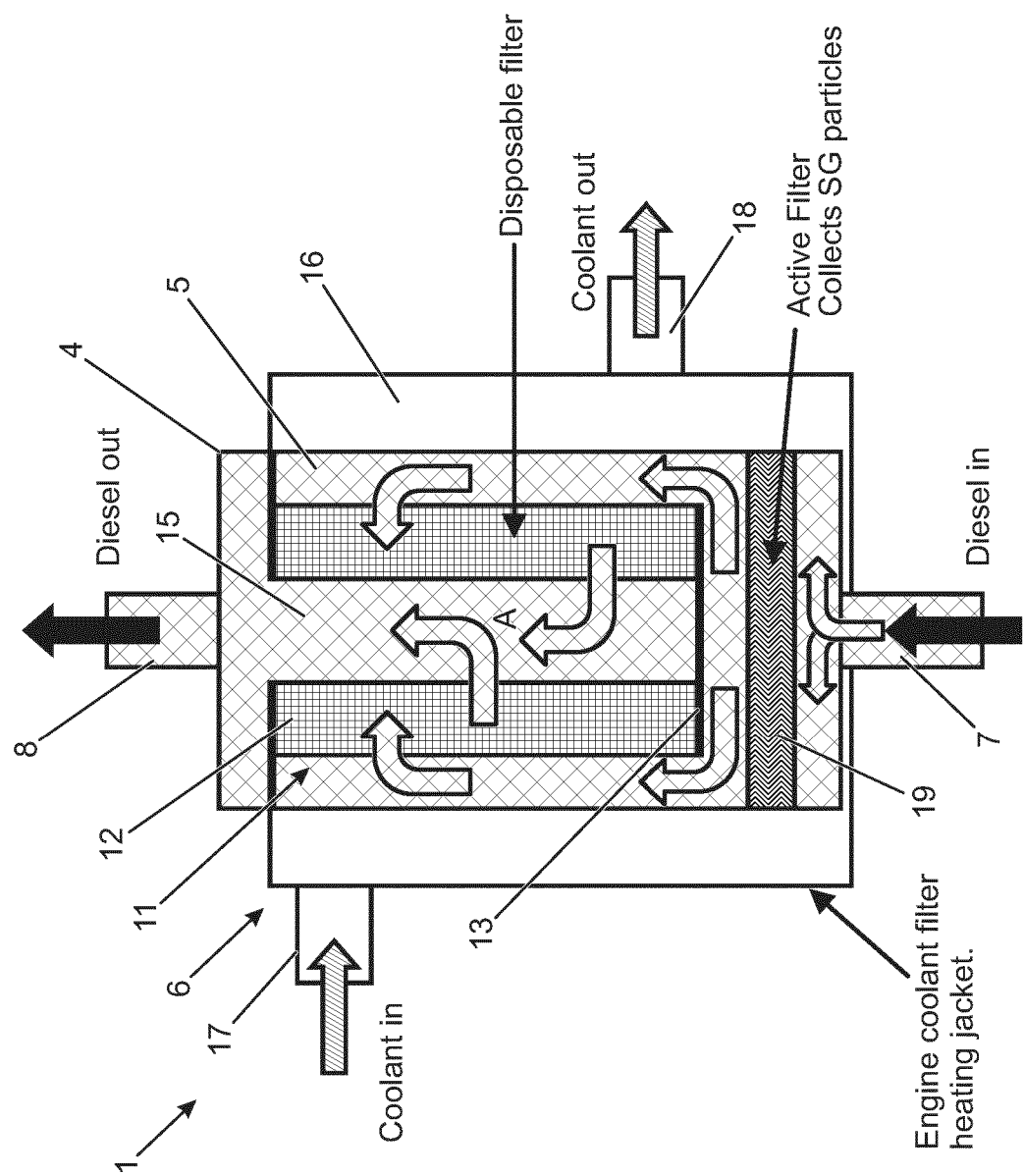
FIG. 5 shows a variant of the fuel filter shown in FIG. 4 incorporating a catalytic component in accordance with an embodiment of the present invention.

A variant of the fuel filter shown in FIG. 4 is shown in FIG. 5. Like references are used for like components. The primary distinction over the fuel filter 1 shown in FIG. 4 is that the central chamber 15 is open to the fuel outlet 8. The end plate 13 is disposed proximal the inlet filter element 19 and arranged such that, in use, fuel is directed into an outer region surrounding the annular filter element 12 after being filtered by the inlet filter element 19. The diesel fuel then flows radially inwardly through the annular filter element 12 into the central chamber 15. The filtered fuel flows from the central chamber 15 through the fuel outlet 8. The flow through the fuel filter 1 is illustrated by a series of arrows A in FIG. 5. In use, the mechanical filter apparatus 11 traps particulates suspended in the diesel fuel, including particulates which have precipitated out of solution. The precipitates can comprise or consist of sterol glycosides, such as sterol glucoside. The catalyst provided in the inlet filter element 19 is effective to break down at least some of the sterol glycosides in the trapped precipitates and to return them to solution, thereby preventing or delaying clogging of the fuel filter 1. It will be appreciated that other types of particulate material trapped in the inlet filter element 19 are unaffected by the catalytic component. By providing a catalyst in the mechanical filter apparatus 11, blocking of the inlet filter element 19 due to the insoluble precipitates in the diesel fuel can be reduced or avoided. It will be appreciated that the annular filter element 12 could be modified also to incorporate a catalytic component.

Figure 6:
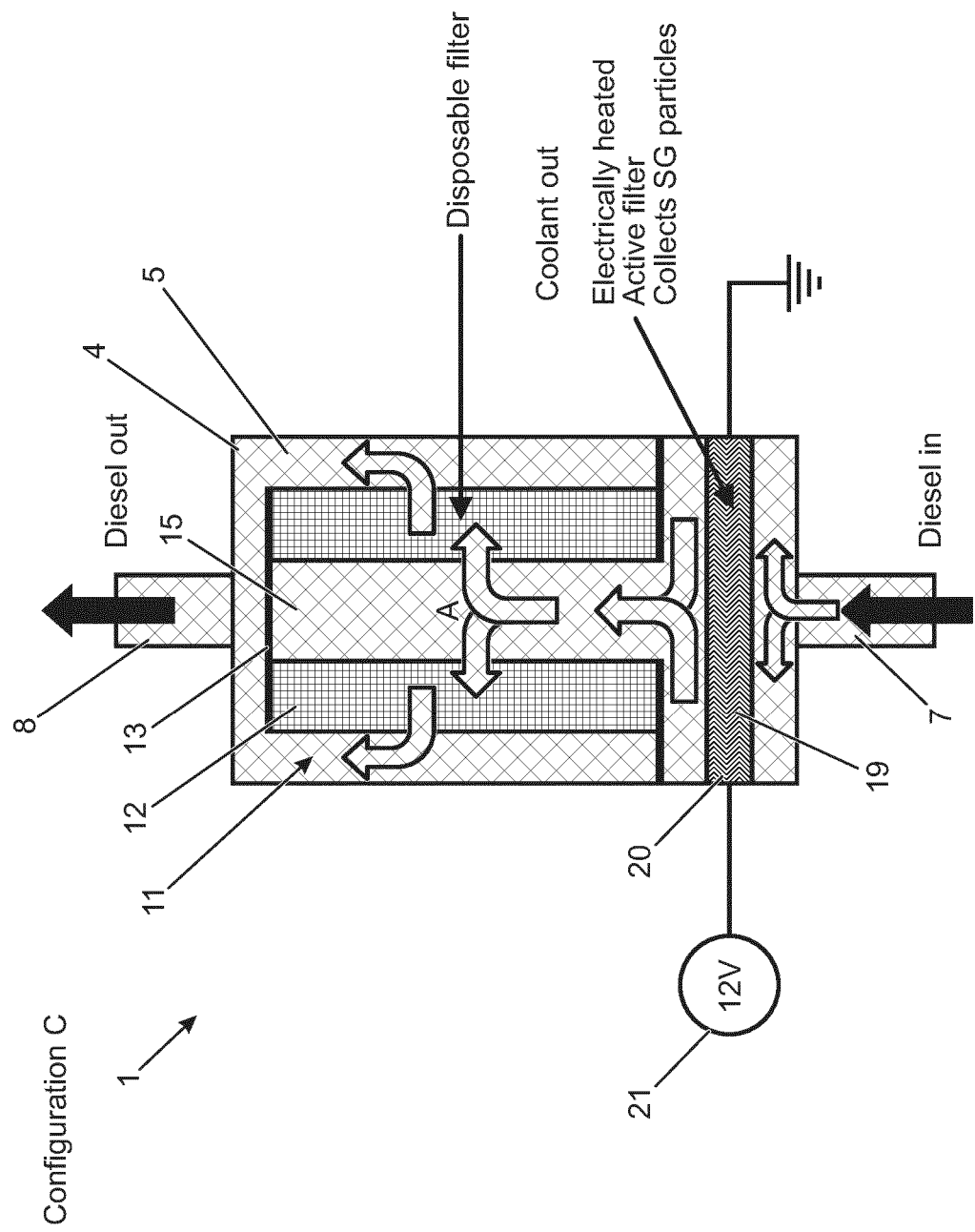
FIG. 6 shows a fuel filter incorporating a catalytic component in accordance with a further embodiment of the present invention.

A further embodiment of the fuel filter 1 in accordance with an aspect of the present invention is shown in FIG. 6. The fuel filter 1 is a development of the embodiment described with reference to FIG. 4 and the description herein focuses on the difference for the sake of brevity. Like reference numerals are used for like components.

The fuel filter 1 comprises a housing 4 which forms a filter chamber 5. A mechanical filter apparatus 11 is disposed within the filter chamber 5 to mechanically filter the diesel fuel. The mechanical filter apparatus 11 comprises an annular filter element 12 and an inlet filter element 19 arranged in series. The composition of the annular filter element 12 and the inlet filter element 19 is substantially unchanged from the previous embodiment. The catalytic component is incorporated into the inlet filter element 19. In this embodiment, the heat exchanger 6 is omitted from the fuel filter 1. Instead, the inlet filter element 19 is heated electrically by a heating element 20 connected to an electrical source 21, such as a vehicle battery. The heating element 20 directly heats the inlet filter element 19 in order to promote the catalytic reaction. It will be appreciated that the operation of the fuel filter 1 is substantially unchanged from that of the previous embodiment. However, rather than supply coolant from the internal combustion engine 2, the heating element 20 is energised to heat the inlet filter element 19. The operation of the fuel filter 1 is unchanged from the previous embodiment. The flow path of the diesel fuel is illustrated by arrows A in FIG. 6.

The heating element 20 could be energized continuously when fuel is supplied to the internal combustion engine 2, for example in conjunction with the fuel pump 10. Alternatively, the heating element 20 could be energized periodically. The heating element 20 could be energized when a flow restriction is detected, for example in dependence on an electrical current drawn by the fuel pump 10. The heating element 20 could be energized in dependence on a fuel temperature and/or an ambient temperature. One or more temperature sensor can be provided for measuring the fuel temperature and/or the ambient temperature. It will be understood that the heating element 20 could be incorporated into the inlet filter element 19 in the variant shown in FIG. 5. A controller (not shown) can be provided for energizing the heating element 20 when the fuel temperature and/or the ambient temperature is below a predetermined threshold.

It will be appreciated that various changes and modifications can be made to the method and apparatus described herein without departing from the scope of the present invention. The catalyst could be separated from the annular filter element 12, for example disposed between the fuel inlet 7 and the annular filter element 12. Furthermore, the heating element 20 described herein with reference to the inlet filter element 19 could be associated with the annular filter element 12. For example, the heating element 20 could be incorporated into the annular filter element 12.

The invention claimed is:

1. A method of filtering diesel fuel for supply to an internal combustion engine, the method comprising:
    passing the diesel fuel through an inline fuel filter provided between a fuel pump and the internal combustion engine to trap precipitates suspended in the diesel fuel; and
    decomposing sterol glycosides trapped by a filter element of the inline fuel filter using a catalyst having a catalytic surface that targets C—O—C bonds at a reaction temperature below 90° C.

2. A method as claimed in claim 1, wherein the catalyst comprises a solid acid catalyst.

3. A method as claimed in claim 2, wherein the catalyst comprises a zeolite catalyst.

4. A method as claimed in claim 3, wherein the catalyst comprises at least one of: silico-alumino-phosphate (SAPO), Zeolite Beta, Zeolite Socony Mobil-5 (ZSM5), and Zeolite Y.

5. A method as claimed in claim 1, wherein
    the catalyst is applied to an exterior of the filter element; or
    the catalyst is incorporated into the filter element.

6. A method as claimed in claim 1, wherein the filter element of the inline fuel filter includes a pre-filter element having said catalytic surface, and another filter element disposed downstream of the pre-filter element;
    the pre-filter element has larger pores than the other filter element; and
    the method comprises passing the diesel fuel through the pre-filter element and then through the other filter element.

7. A method as claimed in claim 1, comprising heating the catalyst.

8. A method as claimed in claim 7, wherein heating the catalyst is performed in dependence on at least one of a measured fuel temperature and a measured ambient temperature.

* * * * *